United States Patent [19]

Kimura et al.

[11] Patent Number: 5,604,720
[45] Date of Patent: Feb. 18, 1997

[54] METHOD AND APPARATUS FOR ACCESSING A TARGET TRACK ON OPTICAL MEDIUM

[75] Inventors: Yasuyuki Kimura, Kawagoe; Koichi Yamazaki, Sakado, both of Japan

[73] Assignee: Nippon Conlux Co., Ltd., Tokyo, Japan

[21] Appl. No.: 424,203

[22] Filed: Apr. 19, 1995

[30] Foreign Application Priority Data

Apr. 22, 1994 [JP] Japan .................................. 6-106307

[51] Int. Cl.$^6$ .................................................. G11B 17/22
[52] U.S. Cl. ........................... 369/32; 369/44.28; 369/15; 235/454
[58] Field of Search ..................... 369/32, 44.26, 369/44.28, 44.29, 44.32, 44.34, 44.35, 44.37, 47, 48, 15, 51, 52; 235/454, 437

[56] References Cited

U.S. PATENT DOCUMENTS

| 4,982,391 | 1/1991 | Sakagami et al. | 369/32 |
| 5,383,170 | 1/1995 | Horiguchi et al. | 369/44.28 |
| 5,436,438 | 7/1995 | Shikichi | 369/44.28 |

FOREIGN PATENT DOCUMENTS 6426927   1/1989   Japan .

*Primary Examiner*—Tan Dinh
*Attorney, Agent, or Firm*—Loeb & Loeb LLP

[57] ABSTRACT

For recording or reproduction of information, the optical beam is moved relative to the recording medium along the longitudinal direction of a certain track. When accessing another track, the relative movement of the light beam along the longitudinal direction of the track is decelerated, and during this deceleration, the light beam is started to move in the direction transverse to the tracks toward the desired track. Thus, it is not necessary to wait for such time when the relative movement of the light beam along the longitudinal direction of the track has been completely stopped, and hence the necessary accessing time can substantially be reduced. If control is made to cause a decelerating rate of the relative movement to decrease continuously gradually or stepwise from a relatively high decelerating rate to a relatively low rate and the light beam is caused to start relatively moving toward the desired track while the relative movement is at the relatively low decelerating rate, it is allowed to effectively suppress occurrence of unwanted mechanical vibration due to abrupt deceleration of the relative movement.

6 Claims, 3 Drawing Sheets

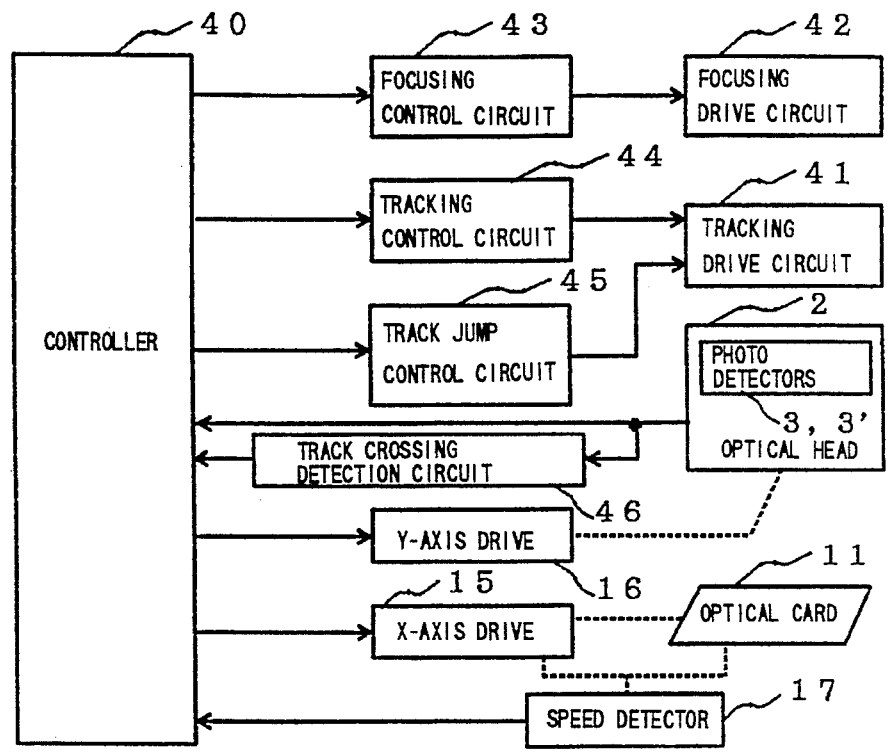
FIG. 2
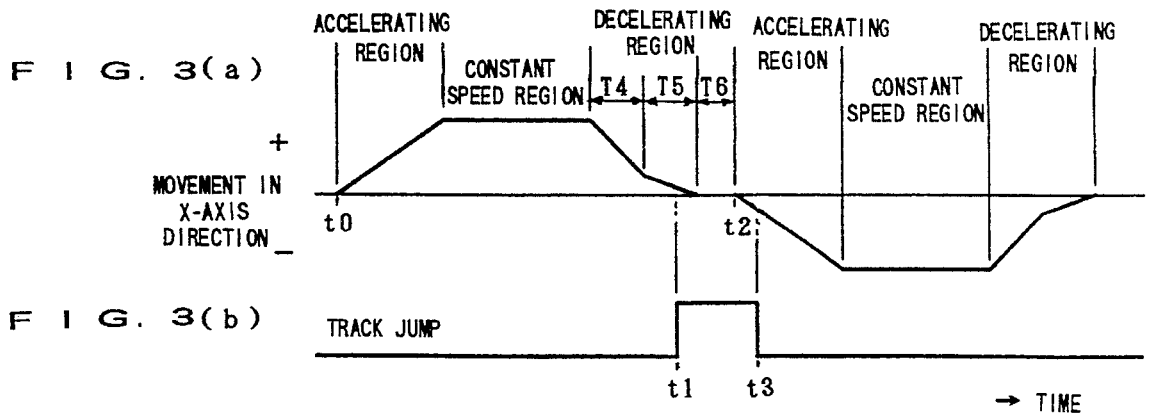
FIG. 3(a)
FIG. 3(b)

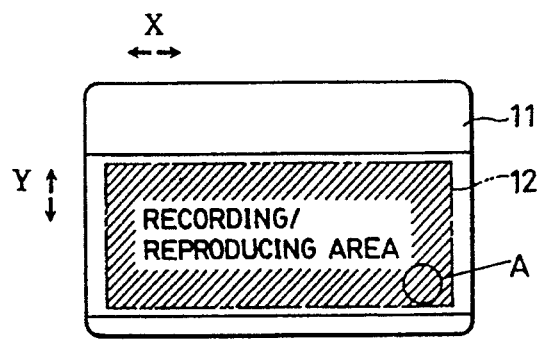
(PRIOR ART) F I G. 4
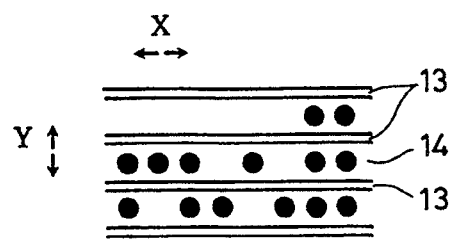
(PRIOR ART) F I G. 5
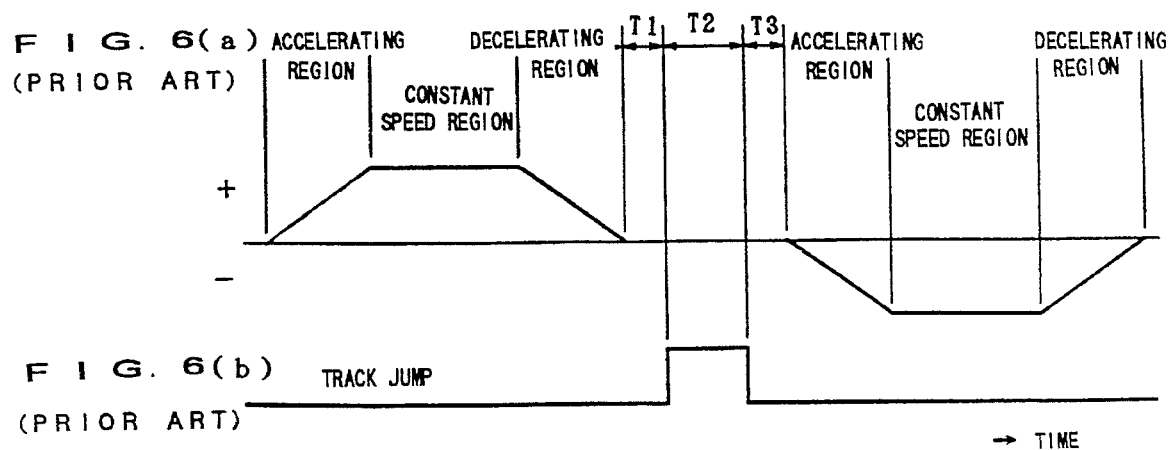
F I G. 6(a) (PRIOR ART)
F I G. 6(b) (PRIOR ART) TRACK JUMP

METHOD AND APPARATUS FOR ACCESSING A TARGET TRACK ON OPTICAL MEDIUM

BACKGROUND OF THE INVENTION

The present invention relates generally to a method of and an apparatus for optically recording and reproducing information onto and from an optical recording medium such as an optical card, and more particularly to improved control for allowing a light beam, irradiated from an optical head, to access a desired track on the information recording surface of an optical recording medium.

Optical recording and reproducing apparatus are known which record and reproduce information onto and from a card-shaped optical recording medium (hereinafter referred to as an optical card) by moving the optical card relative to the optical axis of a laser beam. With the developments and wide spread use of computers etc., a wide use of the optical card has been strongly hoped for in recent years because it is highly portable and safe and yet provides a relatively large storage capacity for its small size. Thus, a variety of applications of the optical card have been proposed, among which is an application as a medium for recording patients' diagnosis in medical organizations.

A typical structural example of the known optical card is shown in FIGS. 4 and 5, of which FIG. 4 is a plan view of the known optical card 11 and FIG. 5 shows, in enlarged scale, a section "A" of the optical card 11 of FIG. 4. In these figures, reference numeral 12 denotes a recording/reproducing area, 13 denotes guide tracks, and 14 denotes a data track. On the recording/reproducing area 12 is formed a recording layer that is for example made of silver chloride photographic material as the base material. By irradiating a laser light spot of a suitable energy level from an optical head onto the recording layer, an optical information unit called a "pit" is formed in the data track 14. The position of the irradiated laser light spot on the recording layer is variable by moving the optical card 11 relative to the optical head in the X-axis direction (direction parallel to or along the length of the data and guide tracks of the optical card 11), so that a series of pits can be formed in a desired arrangement corresponding to desired digital information. Thus, recording and reproduction of desired digital information are performed by writing and reading the pit rows onto and from the recording layer of the optical card 11.

In such a case, in order to form pit rows in the data track 14 of the optical card 11, such an approach is generally employed which uses a drive mechanism such as a linear motor to move the optical card 11 relative to the optical head. However, due to a limited operational accuracy of the drive mechanism, this prior approach can not prevent occurrence of mechanical position errors, due to which pits can not be formed accurately in the middle of the data track 14 located between the guide tracks 13. This presents the significant problem that desired information can not be recorded or reproduced accurately.

In order to avoid the above-mentioned problem, it is absolutely necessary to perform the pit recording and reproduction with the laser beam spot accurately positioned in the middle between the two guide tracks 13. To this end, automatic tracking control (often abbreviated "AT control") has been conventionally employed in an attempt to compensate for any mechanical position error caused.

This automatic tracking control is generally performed on the basis of the so-called "three-beam method", in accordance with which three laser beams spaced apart from each other by a predetermined distance are irradiated from the optical head in such a manner that the central laser beam corresponds to the data track 14 as a read/write beam and the two laser beams on both sides of the central beam (side laser beams) correspond to the guide tracks 13 on both sides of the data track 14 as tracking beams. Namely, the three-beam method measures the respective reflected lights of the two side laser beams from the optical card 11 so as to servo-control the irradiated beam spot positions in such a manner that the tracking beams accurately correspond to the guide tracks 13 in predetermined positional relations thereto and thus the central read/write beam is allowed to always be accurately positioned in a predetermined middle part of the data track 14. Further, it is necessary to have the laser light beam constantly stably focused on the recording layer of the optical card 11, automatic focusing control has conventionally been performed for this purpose.

The above-mentioned automatic tracking and focusing control operations are performed by minutely driving the objective lens of the optical head, via electromagnetic force applied via a tracking coil and a focusing coil, respectively, in the Y-axis direction (i.e., direction transverse to the data and guide tracks of the optical card 11) and in the Z-axis direction (i.e., direction perpendicular to the recording/reproducing surface of the optical card 11). The objective lens serves to focus the laser beam irradiated from the optical head onto the recording layer of the optical card 11 so as to form a focused light spot (three light spots in the case where the above-mentioned three-beam method is employed) on the recording layer.

In the art, such control is also known which is intended for allowing the light beam to access a desired target track or the vicinity thereof by moving the light beam spot across only one or several tracks (in the Y-axis direction) relative to the optical card 11. Where the current position of the laser beam spot is only one or several tracks away from the target track, the control is performed by only moving the objective lens in the Y-axis direction while the body of the optical head is fixed in position, and this control is called a "near-jump" control. On the other hand, where the current position of the laser beam spot is relatively many tracks away from the target track, the light bean spot is positioned in the vicinity of the target track by rapidly moving the body of the optical head itself in the Y-axis direction. This control is called a "far-jump" control. The above-mentioned automatic tracking control is maintained inactive (OFF) during execution of either the near-jump control or the far-jump control, and upon completion of the near-jump or far-jump control, the automatic tracking control is turned ON to draw the light beam spot onto the target track.

As noted above, the information recording or reproducing operation with respect to the optical card is performed while moving the optical card in a parallel direction to the tracks (in the X-axis direction). This movement of the optical card in the X-axis direction is a reciprocating movement where the movement direction is reversed upon the card reaching one of predetermined opposite limit points. When the movement direction of the card is reversed, abrupt deceleration and acceleration would take place, causing considerable mechanical vibration. If the above-mentioned jump control is performed for accessing a desired track while such mechanical vibration is present, there would be caused the operational errors, due to which the light beam spot is drawn to a wrong track when the automatic tracking control is turned ON. One of the conventionally-known approaches for avoiding such operational errors is to perform the jump control for accessing the desired track when the optical card is moving at constant speed, instead of during the deceleration and acceleration of the optical card. But, in that case, there would arise the problem that a part of a storage area corresponding to the constant-speed movement can not be used for information storage purposes, and hence the storage capacity is greatly limited.

In an attempt to provide a solution to the problem, Japanese Patent Laid-open Publication No. SHO 64-27028 (corresponding to U.S. Pat. No. 4,982,391) proposes that, when the movement of the optical card in the X-axis direction is to be reversed, the optical card be prevented from moving over a predetermined time zone and the jump control be performed, during this stop time zone, for accessing a desired track. An example of such control is shown in FIG. 6A, which shows a time-variation instruction value for the X-axis direction movement speed of the optical card, and FIG. 6B, which shows the time zone during which the jump control is performed. In FIG. 6A signs "+" and "−" of the instruction speed values correspond to plus and minus in the X-axis movement direction of the optical card. In this example, the stop time zone comprises time sections T1, T2 and T3. the first time section T1 is set at a specific time length for allowing the mechanical vibration due to the abrupt deceleration to sufficiently lower down, the second time section T2 is at a time length necessary for the jump control, and the third time section T3 is a settling time immediately after the automatic tracking control loop is turned ON upon completion of the jump control, so to speak, a "wait time" before the acceleration of the optical card is started.

However, in the above-discussed prior art, because the deceleration control is still abrupt, it is necessary to set the time section T1 to be sufficient for decreasing the mechanical vibration resultant from the abrupt deceleration, thus requiring extra operation time. Consequently, the prior art has the problem that it requires extra time to access a desired target track for recording or reproduction of information.

SUMMARY OF THE INVENTION

It is therefore an object of the present invention to provide a method and an apparatus which are capable of reducing the necessary operation time for accessing a desired target track for recording or reproduction of information.

In order to achieve the above-mentioned object, the present invention provides a method of recording and/or reproducing optical information in which a light beam is controlled to access a desired track from among a plurality of tracks provided in parallel with each other on an optical recording medium for recording and/or reproducing information, the method comprising the steps of moving the light beam relative to the recording medium along a longitudinal direction of the tracks for recording and/or reproducing the information, decelerating a relative movement of the light beam to the recording medium, and starting moving the light beam in a direction transverse to the tracks toward the desired track while the relative movement is decelerated.

The present invention also provides an optical information recording and/or reproducing device comprising a recording and reproducing optical head section for irradiating a light beam for performing at least one of recording and reproducing with respect to an optical recording medium having a plurality of information recording tracks provided in parallel with each other, a first drive section for moving the light beam relative to the recording medium along a longitudinal direction of the tracks for recording and/or reproducing information, a second drive section for moving the light beam relative to the recording medium in a direction transverse to the tracks so as to control the light beam to access a desired track, a control section for decelerating the relative movement of the light beam by the first section and causing the relative movement by the second section to start while the relative movement is decelerated, so as to control the light beam to access the desired track.

For recording or reproduction of information, the optical beam is moved relative to the recording medium along the longitudinal direction of the tracks. When accessing a desired track, the relative movement of the light beam along the longitudinal direction of the tracks is decelerated, and during this deceleration, the light beam is started to move, in the direction transverse to the tracks, toward the desired track. Thus, it is not necessary to wait for such time when the relative movement of the light beam along the longitudinal direction of the tracks has been completely stopped and the mechanical vibration has been absorbed (time section T1 in the example of FIG. 6A), and hence the necessary accessing time can substantially be reduced. In a preferred mode of embodiment, in order to suppress mechanical vibration due to abrupt deceleration of the relative movement, control is made to cause a decelerating rate of the relative movement to decrease continuously gradually or stepwise from a relatively high decelerating rate to a relatively low rate, and the light beam is caused to start relatively moving toward the desired track while the relative movement is at the relatively low decelerating rate. This decelerating rate control may be performed in such a manner to provide a two-stage or multi-stage rate change, or a smooth, continuous rate change.

Now, the preferred embodiment of the present invention will be described in detail below with reference to the accompanying drawings.

BRIEF DESCRIPTION OF THE DRAWINGS

In the drawings:

FIG. 2 is a block diagram illustrating an embodiment of the control system associated with the optical system shown in FIG. 1;

FIG. 3A is a timing chart illustrating the movement of an optical card in accordance with the present invention;

FIG. 3B is a timing chart for performing the track jump operation;

FIG. 4 is a plan view of an example of a conventionally-known card-shaped recording medium;

FIG. 5 is a plan view showing, in enlarged scale, a recording area of the recording medium of FIG. 4; and FIG. 6A is a timing chart illustrating the conventional movement of an optical card.

FIG. 6B is a timing chart for performing the convention track jump operation.

DETAILED DESCRIPTION OF THE PREFERRED EMBODIMENT

Figure 1:
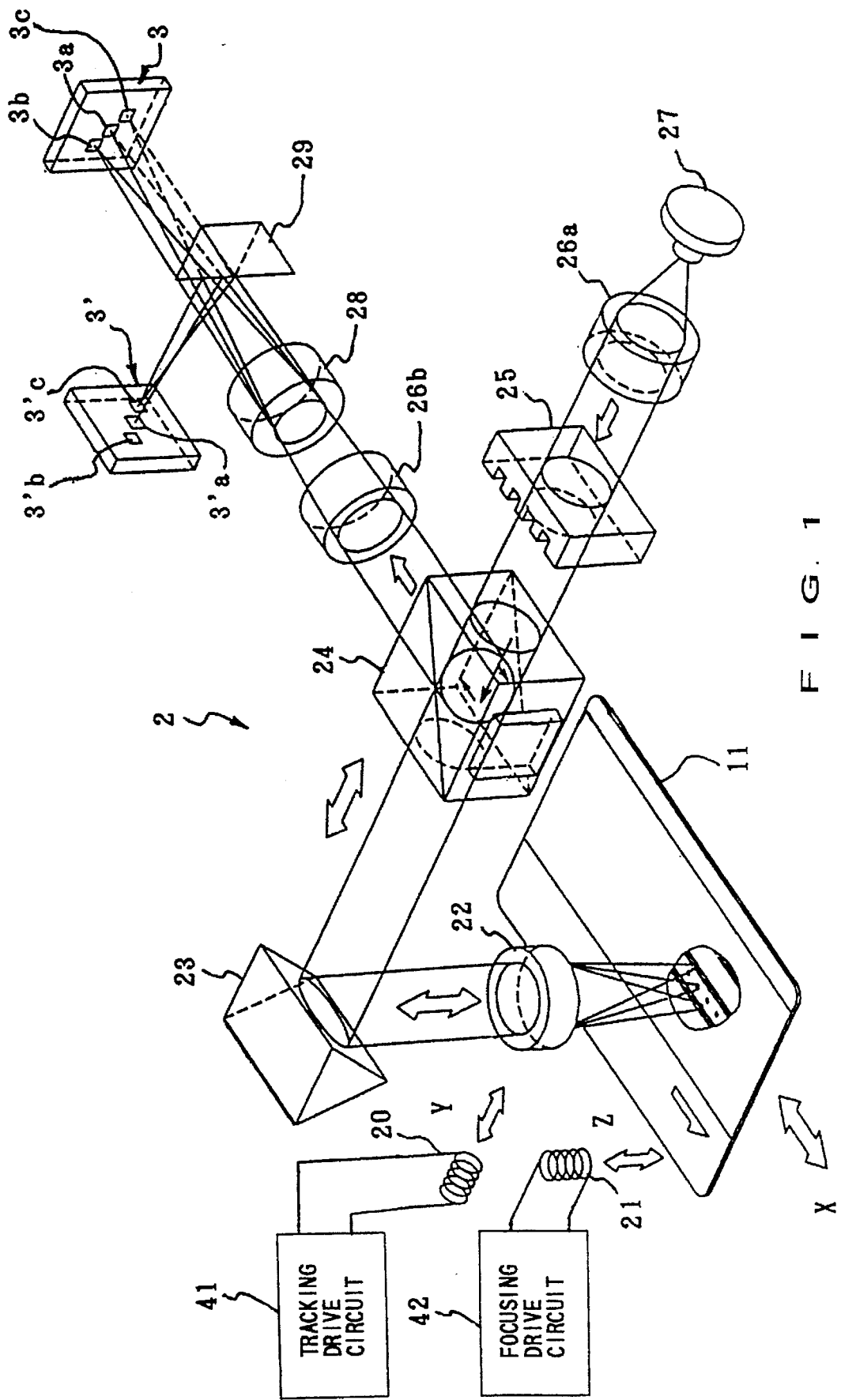
FIG. 1 is a perspective view showing a basic structural example of the optical system of an optical recording and reproducing device applicable for practicing the present invention.

FIG. 1 is a perspective view showing, by way of example, a basic structure of the optical system of the optical recording and reproducing device of the present invention which employs an optical card as a recording medium. FIG. 1 principally shows a relationship between the optical card 11 and the optical system of an optical head 2 positioned above the optical card 11. The detailed structure of the optical card 11 may be the same as shown in FIGS. 4 and 5. By means of an X-axis drive 15 (which includes for example a linear motor) of FIG. 2, the optical card 11 is reciprocatingly movable in the X-axis direction (direction along or parallel to the longitudinal direction (length) of guide and data tracks 13 and 14 of the optical card 11).

In the optical head 2, a laser diode 27 is provided as a laser light source, and diffused light generated from the laser diode 27 is collimated through a collimating lens 26a. The collimated laser light is then divided into three parts through a diffraction grating 25 to form three laser light beams as previously mentioned in connection with the prior art. A beam splitter 24 serves to separate the laser light irradiated onto the optical card 11 and reflected light (reflection) of the laser light from the optical card 11. A reflecting mirror 23 serves to reflect each of the laser light and reflected light to bend its light path by 90°. Further, an objective lens 22 converges and irradiates the collimated laser light onto a recording layer of the optical card 11, to form a light spot thereon.

The reflected light separated by the beam splitter 24 is passed through a collimating lens 26b to be converted into converged light. A concave lens 28 serves to convert the converged light input from the collimating lens 26b into suitable diffused light. An edge mirror 29 serves to divide the reflected light from the optical card 11 equally into two parts. Photo detectors 3 and 3', which receive the respective light parts divided by the edge mirror 29, convert the reflected light parts into electric signals for detection of any tracking and focusing errors. In the example of FIG. 1, the three-beam method and edge-mirror method are employed for detecting the tracking and focusing error, and three light receiving elements 3a, 3b, 3c or 3'a, 3'b, 3'c are provided in each of the photo detectors 3 and 3'.

By electromagnetic force generated by a tracking coil 20, the objective lens 22 can be finely adjusted in position in the Y-axis direction (direction transverse to the data and guide tracks of the optical card 11), and by electromagnetic force Generated by a focusing coil 21, the objective lens 22 can be finely adjusted in position in the Z-axis direction (direction perpendicular to the recording/reproducing surface of the optical card 11). The tracking coil 20 is driven by signal output from the tracking control circuit 41, while the focusing coil 21 is driven by signal output from the focusing control circuit 42. Tracking and focusing errors are detected in any arbitrary manner, and in response to the error detection, the tracking control circuit 41 and the focusing control circuit 42 servo-control the Y-axis and Z-axis positions of the objective lens 22.

FIG. 2 is a block diagram illustrating an embodiment of the control system associated with the optical system shown in FIG. 1. Controller 40 controls the entire operation of the control system and includes, for example, a computer such as a microcomputer. Focusing control circuit 43 performs automatic focusing control on the basis of the output signals from the photo detectors 3 and 3', and provides its output to the focusing drive circuit 42, which in turn drives the focusing coil 21 to servo-control the Z-axis position of the objective lens 22, as noted above. Focusing control circuit 44 performs automatic tracking control on the basis of the output signals from the photo detectors 3 and 3', and provides its output to the tracking drive circuit 41, which in turn drives the tracking coil 20 to servo-control the Y-axis position of the objective lens 22, as noted above. Track jump control circuit 45 performs the above-mentioned near-jump control. In performing this near-jump control, the automatic tracking control by the tracking control circuit 44 is turned inactive (OFF), and then a control signal is provided from the tracking jump control circuit 45 to the tracking drive circuit 41 to drive the tracking coil 20. During the near-jump or far-jump control operation, track crossing detection circuit 46 detects the number of track crossing (for instance, counting the number of the guide tracks 13 the light beam has crossed) on the basis of the output signals from the photo detectors 3 and 3'. Whether the light beam has crossed a desired number of the tracks during the track jump control can be determined on the basis of the output from this track crossing detection circuit 46.

The X-axis drive 15 is provided for moving the optical card 11 in the X-axis direction relative to the optical head 2, and a speed detector 17 is provided for detecting the speed of the optical card's relative movement in the X-axis direction. The speed detector 17 may be of any structural type, such as the type capable of detecting both position and speed where a linear encoder is included for detecting the movement amount in the X-axis direction of the optical card to output encode pulses corresponding to a moving position of the optical card 11 and where a moving speed of the optical card is detected from time intervals of the encode pulses. During information writing or reading with respect to the optical card 11, the controller 40 performs control, as will be described by way of example hereunder, on the basis of the moving speed detected by the speed detector 17.

In FIG. 3A, there is shown by way of example a variation in the speed at which the optical card 11 is moved in the X-axis direction by means of the X-axis drive 15. FIG. 3B shows an example timing for performing the near-jump operation. It is assumed here that at time point t0, the light beam spot is accessing a data track 14, the automatic tracking and automatic tracking control is ON, and the optical card 11 is stopping at a predetermined limit point in the X-axis direction. The optical card 11 starts moving in the X-axis direction at this time point t0, then accelerates and thence makes a movement at a predetermined constant speed. During this constant-speed movement, information is written onto or read from the data track 14 being currently accessed. Deceleration of the optical card movement begins upon reaching a predetermined deceleration point.

According to one embodiment of the present invention, the decelerating operation of the X-axis drive 15 is controlled in such a manner that the deceleration of the relative movement in the X-axis direction takes place in two stages. In the first deceleration stage, control is made to cause the deceleration to be made at a relatively high rate as represented in time zone T4 in FIG. 3A. Then, in the second deceleration stage, control is made to cause the deceleration to be made at a relatively low rate as represented in time zone T5 in FIG. 3A. By such two-stage deceleration control, the deceleration can be smooth enough to prevent occurrence of unwanted mechanical vibration. Then, as represented by a signal rising point t1 in FIG., 3B, movement to a target track to be next accessed starts during the second deceleration stage (i.e., during time zone T5). That is, the controller 40 controls the tracking control circuit 44 to turn OFF the automatic tracking and instructs the track-jump control circuit 45 to start a near-jump operation to the next designated target track. Thus, while the decelerative movement of the optical card 11 in the X-axis direction is in progress by the X-axis drive 15, the objective lens 22 is driven in the Y-axis direction. It should be appreciated that the time point t1 for starting movement to the next target track may be determined either on the basis of time measurements (for example, it may be a predetermined time after the initiation of the second deceleration stage) or on the basis of rate measurements (for example, it may be when the moving speed in the X-axis direction has fallen below a predetermined speed).

After that, the decelerating operation of the X-axis drive is terminated to stop the movement of the optical card 11 in the X-axis direction. Because the present invention is designed to absorb the mechanical vibration by use of the stepwise deceleration control, movement stopping time T6 need not be so long, and hence it is allowed to relatively quickly start the X-axis movement in the reversed direction for information writing or reading with respect to the next track. In other words, it is possible to allow acceleration for the X-axis movement to start before completion of the jump to the target track via the tracking drive in the X-axis direction by the objective lens 22. Of course, where the jump to the target track can be completed quickly, the acceleration for the X-axis movement may be initiated after completion of the jump.

As the light beam spot crosses the guide tracks via the objective lens 22 driven in the Y-axis direction, the number of track crossing is detected by the track crossing detection circuit 46. By detection of one or more tracks depending on the location of the target track, it is determined that the light beam spot has accessed the target track. Then, the jump operation is terminated as represented at time point t2 of FIG. 3A. At the same time as the termination of the jump operation, the controller 40 controls the tracking control circuit 44 to turn ON the automatic tracking control, so that servo-control is performed to allow the light beam spot to accurately make a relative movement over and along the accessed track.

The above-mentioned control by the controller 40 may be performed in accordance with computer software program or by use of dedicated hardware circuitry.

The deceleration in the relative movement in the X-axis direction has been described above as being performed in two stages, but it may be performed three or more stages. It is also possible to reduce the decelerating rate continuously from a relatively high decelerating rate to a relatively low decelerating rate. However, in any case, the track jump operation should be initiated at such a relatively low deceleration stage where the unwanted mechanical vibration has been sufficiently absorbed.

In an alternative embodiment, as with the above-mentioned deceleration stage, the accelerating rate may also be controlled gradually, in a stepwise or continuous fashion, from a relatively high accelerating rate to a relatively low accelerating rate. This will substantially reduce the effect of the mechanical vibration due to abrupt acceleration. In such a case, even when the acceleration for the X-axis movement is started before the jump operation to the target track is completed by the tracking drive in the Y-axis direction of the objective lens 22, the initial acceleration is at a relatively slow rate so that the effect of the mechanical vibration is effectively prevented from being exerted to the jump operation. Accordingly, it is possible to relatively quickly start the X-axis movement in the reversed direction for information writing or reading onto or from the next track, before the track jump operation is completed, and therefore the over-all processing time can be substantially reduced.

Further, although the control of the present invention has been described above as applied to the near-jump operation, it may be applied to the far-jump operation. That is, the operation to move the light beam across the tracks (in the Y-axis direction) may be done via the Y-axis drive 16 rather than the tracking coil 20.

Furthermore, the optical recording medium for use with the recording and reproducing device may be other than the card-shaped medium, such as a disk-shaped medium. Moreover, the fundamental structure of the optical or control system for practicing the method or device of the present invention may be any other suitable structure than shown in FIG. 1 or 2.

According to the present invention as has been described so far, the relative movement of the light beam along the length of the tracks is decelerated, and during this deceleration, the light beam is caused to start relatively moving in a direction transverse to the tracks toward a desired target track. This makes it unnecessary to wait the track-jump operation until the relative movement along the length of the tracks is completely stopped, and hence the present invention achieves the benefit that the necessary time for accessing a target track can be substantially reduced. Moreover, because the above-mentioned deceleration is controlled to vary continuously gradually or stepwise from a relatively high decelerating rate to a relatively low decelerating rate and the relative movement of the light beam in the direction transverse to the tracks is initiated while the relative movement is at the relatively low decelerating rate, it is possible to effectively suppress the unwanted effect of mechanical vibration due to abrupt deceleration.

What is claimed is:

1. A method of recording and/or reproducing optical information in which a light beam is controlled to access a desired track from among a plurality of tracks provided in parallel with each other on an optical recording medium, the method comprising the steps of:

moving the light beam relative to the optical recording medium along a longitudinal direction of the plurality of tracks;

decelerating a movement of the light beam relative to the optical recording medium along the longitudinal direction, wherein the step of decelerating the movement of the light beam includes controlling a speed of the movement of the light beam relative to the optical recording medium to decrease gradually or stepwise from a relatively high speed to a relatively low speed; and moving the light beam in a direction transverse to the plurality of tracks toward the desired track while the movement of the light beam relative to the optical recording medium is at the relatively low speed.

2. A method as defined in claim 1, wherein the step of decelerating slows the movement of the light beam relative to the optical recording medium in order to reverse a direction of the movement, and wherein the step of decelerating includes stopping the movement after deceleration and then accelerating the movement in the reversed direction.

3. A method as defined in claim 2 wherein the movement is stopped and then accelerated during a period after the step of moving the light beam relative to the optical recording medium toward the desired track but before access to the desired track is completed.

4. A method as defined in claim 1 wherein the optical recording medium is a removable card-shaped medium.

5. An optical information recording and reproducing device comprising:

optical head means for irradiating a light beam for recording to and reproducing from an optical recording medium having a plurality of tracks provided in parallel with each other;

first drive means for moving the light beam relative to the optical recording medium along a longitudinal direction of the plurality of tracks;

second drive means for moving the light beam relative to the optical recording medium in a direction transverse to the plurality of tracks so as to control the light beam to access a desired track;

first control means for controlling the first drive means to decelerate a movement of the light beam relative to the optical recording medium along the longitudinal direction, the first control means controlling a speed of the movement of the light beam to decrease gradually or stepwise from a relatively high speed to a relatively low speed; and second control means for controlling the second drive means to move the light beam relative to the optical recording medium in the direction traverse to the plurality of tracks while the movement along the longitudinal direction is at the relatively low speed.

6. An optical information recording and reproducing device as defined in claim 5 wherein the optical recording medium is a removable card-shaped medium.

* * * * *